(12) United States Patent
Schobeß et al.

(10) Patent No.: US 10,312,848 B2
(45) Date of Patent: Jun. 4, 2019

(54) METHOD FOR OPERATING AN ELECTRIC MACHINE

(71) Applicant: AUDI AG, Ingolstadt (DE)

(72) Inventors: Nico Schobeß, Gaimersheim (DE); Mohamed Hammam, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 1 day.

(21) Appl. No.: 15/535,171

(22) PCT Filed: Dec. 10, 2015

(86) PCT No.: PCT/EP2015/079214
§ 371 (c)(1),
(2) Date: Aug. 2, 2017

(87) PCT Pub. No.: WO2016/092000
PCT Pub. Date: Jun. 16, 2016

(65) Prior Publication Data
US 2018/0019696 A1    Jan. 18, 2018

(30) Foreign Application Priority Data

Dec. 12, 2014  (DE) .......................... 10 2014 018 431

(51) Int. Cl.
*H02P 27/08*  (2006.01)
*H02P 23/00*  (2016.01)
*H02P 6/15*  (2016.01)

(52) U.S. Cl.
CPC ............... *H02P 27/08* (2013.01); *H02P 6/15* (2016.02); *H02P 23/00* (2013.01); *H02P 2209/00* (2013.01)

(58) Field of Classification Search
CPC ...................................................... H02P 27/08
(Continued)

(56) References Cited

U.S. PATENT DOCUMENTS

2004/0095090 A1*  5/2004  Nukushina ............... H02P 6/28
                                                          318/800
2004/0195995 A1   10/2004  Quirion et al.
(Continued)

FOREIGN PATENT DOCUMENTS

CN       1511369 A      7/2004
CN     101154911 A      4/2008
(Continued)

OTHER PUBLICATIONS

English translation of the International Preliminary Report on Patentability dated Jun. 22, 2017 issued in corresponding International Application No. PCT/EP2015/079214; 8 pgs.
(Continued)

*Primary Examiner* — Kawing Chan
*Assistant Examiner* — Bradley R Brown
(74) *Attorney, Agent, or Firm* — Maier & Maier, PLLC (57) ABSTRACT

A method for checking an operation of an electric machine, which has three phases. For pulses of a first electric variable of the three phases, a pulse width modulation is carried out. Depending in each case on a positioning of electromechanical components of the electric machine with respect to one another, the first electric variable has a pulse with a longest pulse width for a first of the three phases, a pulse with an intermediate pulse width for a second of the three phases, and a pulse with a shortest pulse width for a third of the three phases. A cycle of the pulse width modulation is delimited by two points in time.

14 Claims, 4 Drawing Sheets

(58) Field of Classification Search
USPC .......................................................... 318/504
See application file for complete search history.

(56) References Cited

U.S. PATENT DOCUMENTS

2008/0191660 A1*  8/2008  Krause .............. H02M 7/53875
                                                        318/811
2013/0147408 A1    6/2013  Sugiura

FOREIGN PATENT DOCUMENTS

| CN | 103986402 A    | 8/2014 |
| DE | 102006052467 A1 | 5/2008 |
| DE | 102014203529 A1 | 8/2014 |
| EP | 1650861 A1     | 4/2006 |

OTHER PUBLICATIONS

International Search Report dated Mar. 14, 2016 in corresponding PCT/EP2015/079214; 16 pages.
German Examination Report dated Aug. 7, 2015 in corresponding DE1102014018431.5; 6 pages.
German Examination Report dated Dec. 10, 2015 in corresponding DE1102014018431.5; 5 pgs.
German Examination Report dated Apr. 12, 2016 in corresponding DE1102014018431.5; 5 pgs.
Yikun Gu et al., "Switching-State Phase Shift Method for Three-Phase-Current Reconstruction With a Single DC-Link Current Sensor", IEEE Transactions on Industrial Electronics, vol. 58, Issue 11, Nov. 2011, 9 pgs.
Chinese Office Action dated Dec. 5, 2018, in connection with corresponding CN Application No. 201580067319.9 (15 pgs., including machine-generated English translation).

* cited by examiner

METHOD FOR OPERATING AN ELECTRIC MACHINE

FIELD

The invention relates to a method for operating an electric machine and a system for operating an electric machine.

BACKGROUND

An electric machine can have several phases for a first electric variable, which can be balanced with respect to one another via a pulse width modulation. However, it is possible to measure a value of a second electric variable only at specific points in time and thus not permanently.

Against this background, a method and a system with the features of the independent patent claims are presented. Embodiments of the method and of the system ensue from the dependent patent claims and from the description.

SUMMARY OF THE DISCLOSURE

The method according to the invention is provided for checking an operation of an electric machine that has three phases, wherein a pulse width modulation is carried out for pulses of an electric variable of the three phases. Depending on a positioning of electromechanical components of the electric machine with respect to one another, a first electric variable has a longest pulse with a longest pulse width for a first of the three phases, an intermediate pulse with an intermediate pulse width for a second of the three phases, and a shortest pulse with a shortest pulse width for a third of the three phases. Moreover, a cycle of the pulse width modulation is delimited by two points in time, namely, a point in time at the beginning of the cycle and a point in time at the end of the cycle. In the method, a first pulse of the three phases is shifted with respect to a first of the two points in time that delimit the cycle, and a second pulse of the three phases is shifted with respect to a second of the two points in time that delimit the cycle, whereas a third pulse of the three phases remains unshifted. At least one value of a second electric variable is measured during the cycle within at least one measurement window.

In the scope of the method, both a voltage and a current are to be taken into consideration as electric variables. In the case that the voltage is defined as being the first electric variable, two of three voltage pulses, as pulses of the voltage, are shifted as the first electric variable. In this case, the current is to be defined as the second electric variable and is to be measured within the measurement window or during the voltage pulses. It is also conceivable to define the current as the first electric variable and the voltage as the second electric variable.

In design, different variants are provided in regard to which two of the three pulses are shifted at one of the two points in time that delimit the cycle and in regard to which pulse remains unshifted. The possible variants are represented on the basis of the following Table 1:

TABLE 1

| Variant | Pulse with longest pulse width ... | Pulse with intermediate pulse width ... | Pulse with shortest pulse width ... |
|---|---|---|---|
| 1 | ... is shifted at the first of the two points in time. | ... remains unshifted. | ... is shifted at the second of the two points in time. |
| 2 | ... is shifted at the first of the two points in time. | ... is shifted at the second of the two points in time. | ... remains unshifted. |
| 3 | ... is shifted at the second of the two points in time. | ... remains unshifted. | ... is shifted at the first of the two points in time. |
| 4 | ... is shifted at the second of the two points in time. | ... is shifted at the first of the two points in time. | ... remains unshifted. |
| 5 | ... remains unshifted. | ... is shifted at the first of the two points in time. | ... is shifted at the second of the two points in time. |
| 6 | ... remains unshifted. | ... is shifted at the second of the two points in time. | ... is shifted at the first of the two points in time. |

Usually, the first of the two points in time is the point in time at the beginning of the cycle and the second of the two points is the point in time at the end of the cycle.

During an operation of the electric machine, two electromechanical components of the electric machine are moved in relation to each other, usually rotated, and, depending on the type of operation and/or the design of the electric machine, electric energy is converted to mechanical energy or mechanical energy is converted to electric energy. One of the two electromechanical components is usually designed as a stator and the other as a rotor and/or is to be referred to as such. Moreover, one of the two electromechanical components comprises permanent magnets and the other coils, which interact when conversion of energy via electromagnetic fields is to be carried out. In the case that the two electromechanical components rotate in relation to each other, their respective position with respect to each other is dependent on an angle position or angular position. A length of pulses widths of the pulses of the phases changes during operation of the electric machine depending on the position and/or angular position, for example permutatively.

Usually, the pulses of the first electric variable, that is, either the voltage or the current, are shifted. Furthermore, the at least one value of the second electric variable, that is, usually either the current or the voltage, is measured for an intermediate circuit of the electric machine.

A point in time that delimits the at least one measurement window is placed at one of the two points in time that delimit the cycle. Accordingly, the measurement window begins at the point in time at the beginning of the cycle or ends at the point in time at the end of the cycle. As a rule, two measurement windows are utilized, namely, one at the end of the cycle and one at the beginning of the cycle of the pulse width modulation, and, in the measurement window at the beginning, the value of the pulse that is shifted at the point in time at the beginning is measured and, in the measurement window at the end, the value of the pulse that is shifted at the point in time at the end is measured. The value of the intermediate pulse is calculated from the values of the two other pulses.

The method is carried out for an electric machine designed as an electric motor and/or as a generator. The method is also suitable for an electric machine that is operated both as a motor and as a generator.

As second electric variable, a current that flows through the electric machine and flows through at least one of the phases and/or the intermediate circuit is checked, with two pulses formed as voltage pulses of the respective phases of the voltage being shifted as first electric variable and the at least one value of the current being measured within the at least one measurement window.

As provided for in Table 1 in accordance with the first variant, for example, the longest pulse at the point in time at the beginning of the cycle and the shortest pulse at the point in time at the end of the cycle are shifted. Alternatively, in accordance with the third variant, the longest pulse at the point in time at the end of the cycle and the shortest pulse at the point in time at the beginning of the cycle are shifted. In accordance with these two variants, the longest and the shortest pulse are edge-aligned in the scope of the pulse width modulation and accordingly shifted at the respective point in time that delimits the cycle and/or equalized or balanced at this respective point in time. In contrast, the intermediate pulse, the position of which is or remains unchanged during the cycle, is center-aligned. In the other variants presented on the basis of Table 1, a corresponding procedure is followed.

Moreover, an operation of the electric machine is checked, taking into consideration the at least one measured value, and accordingly controlled and/or regulated.

The system according to the invention or a corresponding arrangement for checking an operation of an electric machine that has three phases comprises a microcontroller and at least one sensor. In this case, the microcontroller is designed for carrying out a pulse width modulation for pulses of a first electric variable, either the voltage or the current, of the three phases. Depending on a positioning of electromechanical components of the electric machine with respect to one another in each case, the first electric variable has a pulse with a longest pulse width for a first of the three phases, a pulse with an intermediate pulse width for a second of the three phases, and a pulse with a shortest pulse width for a third of the three phases. Moreover, a cycle of the pulse width modulation is delimited by two points in time, namely, a point in time at the beginning of the cycle and a point in time at the end of the cycle. Moreover, the microcontroller is designed for shifting a first pulse of the three phases at a first of the two points in time that delimit the cycle and a second pulse of the three phases at a second of the two points in time that delimit the cycle. The at least one sensor is designed for measuring at least one value of a second electric variable during the cycle within the at least one measurement window.

In an embodiment, the system has only one sensor for measuring the at least one value of the second electric variable. As a rule, the at least one sensor is designed as a measuring resistor.

Furthermore, the microcontroller is designed for shifting asynchronously the pulse of the first electric variable that is to be shifted.

Through implementation of the method, an actuation of an electric machine, usually an electric motor or, if appropriate, a generator, is possible. In the process, through an adjustment of pulses of the phases of the first electric variable—for example, the voltage or the current—by way of a pulse width modulation with a single measuring resistor or measuring shunt, a reconstruction of the phases of the second electric variable—for example, the current or the voltage—and thus a phase current reconstruction or a phase voltage reconstruction is possible.

In the process, an adjustment of a control and accordingly of an actuation and/or regulation of an electric drive, as example of an electric machine, is possible. Moreover, without any limitation of the control of the electric machine to be carried out, a measuring shunt and thus a component for measurement of the current or of the voltage is dispensed with and the robustness of the electric machine is increased.

Further advantages and embodiments of the invention ensue from the description and the appended drawing.

It is obvious that the above-mentioned features and the features still to be discussed below can be used not only in the respectively given combination, but also in other combinations or alone, without departing from the scope of the present invention.

BRIEF DESCRIPTION OF THE DRAWING

The invention is illustrated schematically in the drawings on the basis of embodiments and is described schematically and in detail with reference to the drawings.

DETAILED DESCRIPTION OF THE DRAWING

The figures will be described in connection with one another and in an overarching manner, with identical reference signs referring to identical components.

Figure 1:
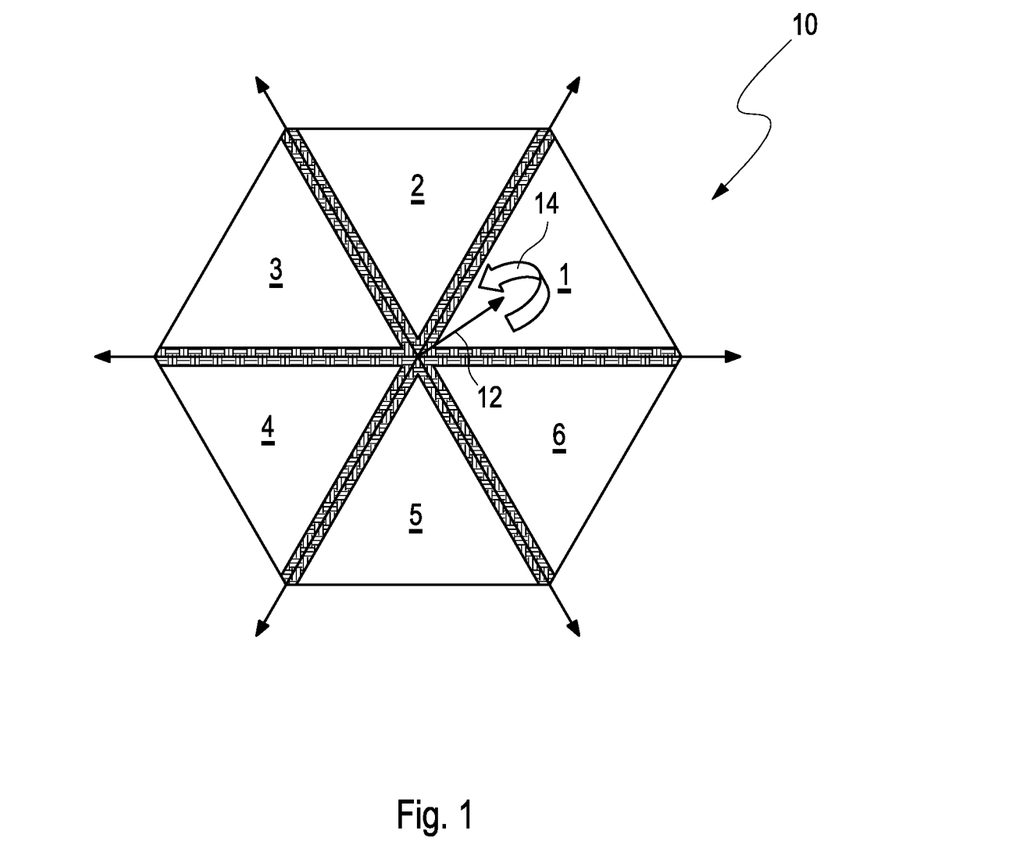
FIG. 1 shows a schematic space vector drawing for a voltage vector of an electric machine.

The space vector drawing 10 of FIG. 1 for illustration of a course of a voltage vector 12 of a voltage as first electric variable of an electric machine comprises here a hexagon, which is divided into a first sector 1, which here spans angular positions from 0° to 60°, a second sector 2, which here spans angular positions from 60° to 120°, a third sector 3, which here spans angular positions from 120° to 180°, a fourth sector 4, which here spans angular positions from 180° to 240°, a fifth sector 5, which here spans angular positions from 240° to 300°, and a sixth sector 6, which here spans angular positions from 300° to 360°. The angular positions given here relate to electric angles. The voltage vector 12, which, during an operation of the electric machine rotates, as indicated by the curved arrow 14, and, in the process, passes through the six sectors 1, 2, 3, 4, 5, 6 in succession at regular intervals, extends from a center of the hexagon. A position—here, an angular position of the voltage vector—depends on a relative position or angular position of two electromechanical components of the electric machine.

For measurement of a current as second electric variable of the electric machine with a single measuring resistor or single shunt and accordingly only one sensor for current measurement in an intermediate circuit of a three-phase electric machine, designed here as an electric motor, either one phase or two phases is or are to be engaged in parallel for the actuation thereof. The current thereby measured in or by the measuring resistor as second electric variable corresponds to the current of one of the three phases in each case. The power electronics of the electric machine comprise a plurality of electronic switch elements—here, three highside switch elements and three lowside switch elements. In the case that either all three highside or all three lowside switch elements are engaged, no current flows in the intermediate circuit. The electronic switch elements are designed either as MOSFETS or metal oxide semiconductor field effect transistors or else as IGBTs or bipolar transistors. Accordingly, the power electronics comprise, for example, three highside and three lowside MOSFETS or three highside and three lowside IGBTs.

Shown in Table 2 in a right column are values of a current $I_z$, which flows through the intermediate circuit, as a function of the three currents flowing through the phases, namely, $I_1$ (for a first phase), $I_2$ (for a second phase), $I_3$ (for a third phase), for different switching possibilities, which are given in a left column of Table 2 by a switching vector (a, b, c). In this case, a unit vector a is assigned to a first phase, a unit vector b to a second phase, and a unit vector c to a third phase. In the case that, for a value of a unit vector a, b, c in the left column, the value 1 is given, a highside switch element associated with the respective phase is engaged. In the case that, for a unit vector a, b, c in the left column, the value 0 is given, a lowside switch element associated with the respective phase is engaged. Accordingly, Table 2 shows an example for switching possibilities of electronic switch elements and the resulting values of the current $I_z$ flowing through the intermediate circuit, said current corresponding here, depending on the positioning of the electronic switch elements, to a positive or negative value of one of the three phase currents $I_1$, $I_2$, $I_3$. In the case that the electric motor is designed as a direct current motor, the current $I_z$ through the intermediate circuit is also a direct current $I_{dc}$.

TABLE 2

| Switching vector (a, b, c) | Current $I_z$ of the intermediate circuit |
|---|---|
| (1, 1, 1) or (0, 0, 0) | 0 |
| (1, 0, 0) | $I_1$ |
| (1, 1, 0) | $-I_3$ |
| (0, 1, 0) | $I_2$ |
| (0, 1, 1) | $-I_1$ |
| (0, 0, 1) | $I_3$ |
| (1, 0, 1) | $-I_2$ |

When an electronic switch element is engaged, the current flowing through the intermediate circuit and accordingly an intermediate circuit current oscillates, usually because of the inherent capacitance and inherent inductance of the respective electronic switch element. Alternatively or additionally, other effects, such as, reverse recovery effects, can also lead to oscillations in the intermediate circuit. However, in order to be able to measure correctly a value of the intermediate circuit current, a control element (controller) provided for this has to wait until the oscillations of the intermediate circuit current have died out. Only then can the current be measured precisely. In the process, there exists at all times only a minimal measurement window in order to be able to measure the current correctly, that is, precisely and free of oscillations.

The non-measurable range of the current is cross-hatched in FIG. 1. The voltage applied at the machine is illustrated with the rotating voltage vector 12, the length of which depends on the applied voltage and the rotational speed of which depends on the rotational speed with which the electromechanical components of the electric machine rotate in relation to one another. At a low rotational speed, the applied voltage is small and, in this case, the voltage vector 12 is situated for the most part in the cross-hatched region, in which no measurement of the current is possible. The smaller the required voltage is, the smaller the voltage vector 12 is, with no measurement of the current being possible when the voltage vector 12 drops below a minimal length. In this case, the voltage vector is situated in the cross-hatched region the entire time.

Figure 2:
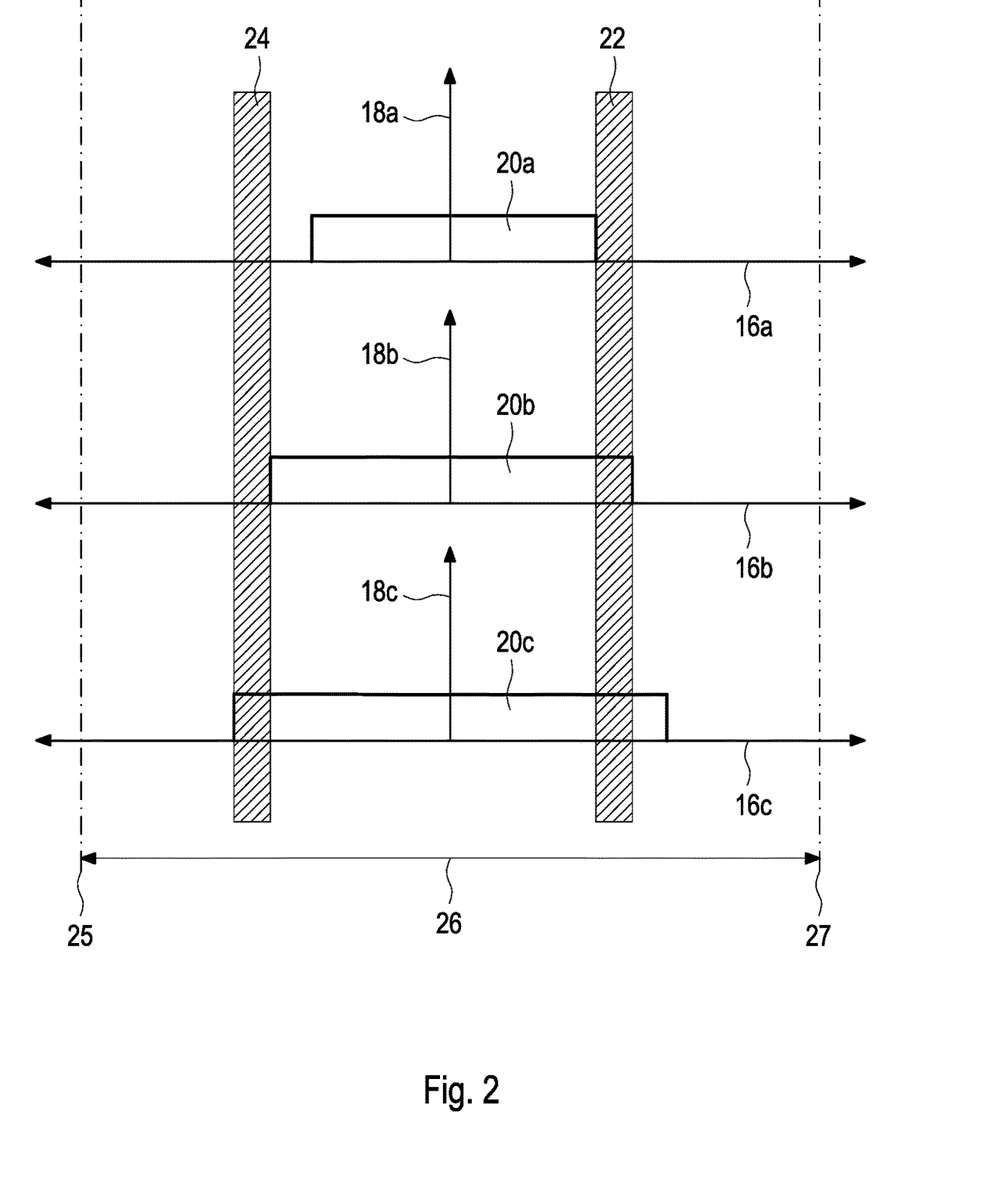
FIG. 2 shows a diagram with an example of the arrangement of measurement windows for measurement of a current as electric variable in accordance with prior art.

The diagram of FIG. 2 comprises three abscissas 16a, 16b, 16c, along each of which the time is plotted. Plotted along a first ordinate 18a are values of the voltage as first electric value, that is, a voltage $U_1$ of the first phase, along a second ordinate 18b values of a voltage $U_2$ of the second phase, and, along a third ordinate 18c values of a voltage $U_3$ of the third phase. Furthermore, a first original voltage pulse 20a of the first phase, a second original voltage pulse 20b of the second phase, and a third original voltage pulse 20c of the third phase are illustrated. In this case, the first original voltage pulse 20a has a shortest pulse width, the second original voltage pulse 20b has an intermediate pulse width, and the third original voltage pulse 20c has a longest pulse width. Illustrated in the diagram, moreover, are an old measurement window 22 for measurement of the current as second electric variable of the second phase to be employed in accordance with prior art and an old measurement window 24 for measurement of the current as second electric variable of the third phase. Further illustrated in the diagram by a double arrow 26 is a cycle of a pulse width modulation for the electric machine, which begins at a point in time 25 at the beginning of the cycle and ends at a point in time 27 at the end of the cycle 26.

On account of the position in time of the old measurement windows 22, 24 in relation to the voltage pulses 20a, 20b, 20c, a measurement of the currents is possible only within limits by means of a single measuring resistor, for which reason the machine can be regulated securely at low rotational speeds, for example. At high rotational speeds, the measurement of the current is also not possible in some regions. Accordingly, the measurement of the current of a respective phase and thus the required reconstruction of the current is imprecise and this, in turn, has consequences on the ability to regulate the electric machine. As a rule, two measurements are possible for a field-oriented regulation within the cycle of the pulse width modulation.

Figure 3:
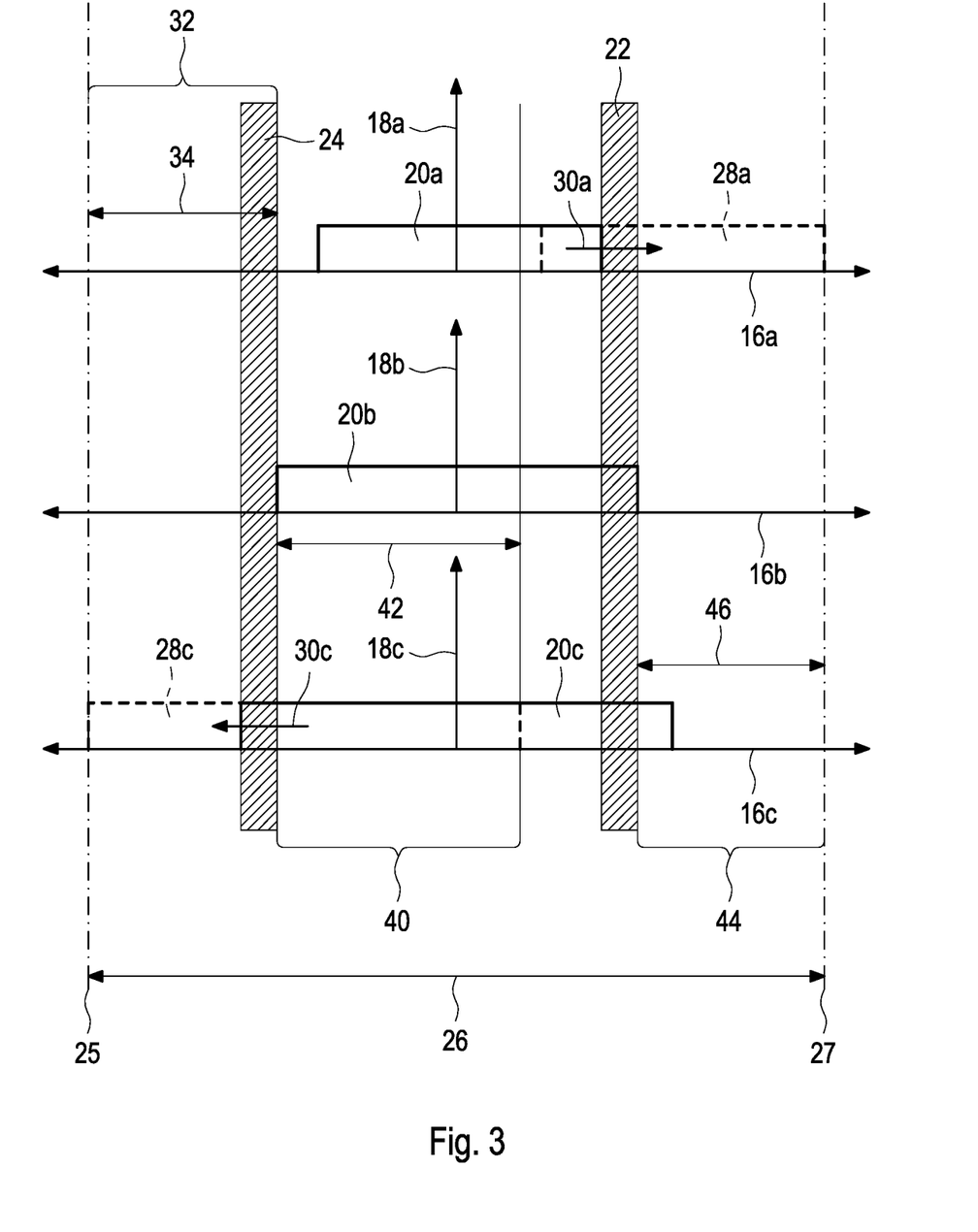
FIG. 3 shows a diagram with measurement windows for measurement of the current as electric value, as said measurement windows are arranged in an embodiment of the method according to the invention.

The diagram of FIG. 3 for illustration of the embodiment of the method according to the invention is based on the diagram of FIG. 2. Illustrated to this end in this diagram, in addition to the original voltage pulses 20a, 20b, 20c and the old measurement windows 22, 24, are a first voltage pulse 28a shifted to the right in the direction of a first arrow 30a in the scope of the invention, said first voltage pulse originating here from the first original voltage pulse 20a with the shortest pulse width, a third voltage pulse 28c shifted to the left in the direction of a second arrow 30c in the scope of the invention, said third voltage pulse originating here from the third original voltage pulse 20c with the longest pulse width, a new measurement window 32 for measurement of the current $I_1$ of the first phase, the length of which in time is indicated by a double arrow 34, a first new measurement window 40 for measurement of the current $I_3$ of the third phase, the length of which in time is indicated by a double arrow 42, and a second new measurement window 44 for measurement of the current $I_3$ of the third phase, the length of which in time is indicated by a double arrow 46.

In order to make possible at all times a useable measurement of the current, at least two of the original voltage pulses 20a, 20b, 20c are shifted within the cycle of the pulse width modulation (double arrow 26) depending on an angular position of the voltage vector 12 of FIG. 1, with the first and the third shifted voltage pulse 28a, 28c ensuing here for the first and third phase, whereas the original second voltage pulse 20b of the second phase, which has the intermediate pulse width, remains unchanged.

In the process, it is provided that the first shifted voltage pulse 28a begins at the point in time 27 at the end of the cycle and the third shifted voltage pulse 28c at the point in time 25 at the beginning of the cycle. The two shifted voltage pulses 28a, 28c are accordingly edge-aligned. The intermediate original voltage pulse 20b remains unchanged in time and is accordingly center-aligned. The first new measurement window 32 begins at the point in time 25 at the beginning of the cycle. The third new measurement window 44 ends at the point in time 27 at the end of the cycle. Usually, measurement windows 32, 40, 44 are arranged overlapping in time with respect to the shifted voltage pulses 28a, 28e.

In each sector 1, 2, 3, 4, 5, 6, a voltage pulse 20a or 28a, 20b, 20c or 28c of a first of the three phases—in the diagram of FIG. 3, currently the voltage pulse 20a or 28a of the first phase—has a shortest pulse width, a voltage pulse 20a or 28a, 20b, 20c or 28c of a second of the three phases—in the diagram of FIG. 3 currently the voltage pulse 20b of the second phase—has an intermediate pulse width, and a voltage pulse 20a or 28a, 20b, 20c or 28c of a third of the three phases—in the diagram of FIG. 3, currently the voltage pulse 20c or 28c of the third phase—has a longest pulse width.

The following Table 3 shows an assignment of a length of the pulse widths to the voltage pulses 20a or 28a, 20b, 20c or 28c of the three phases in a respective sector 1, 2, 3, 4, 5, 6 (FIG. 1):

TABLE 3

| Sector | Pulse width of the voltage pulse of the first phase | Pulse width of the voltage pulse of the second phase | Pulse width of the voltage pulse of the third phase |
| --- | --- | --- | --- |
| 1 | long | intermediate | short |
| 2 | intermediate | long | short |
| 3 | short | long | intermediate |
| 4 | short | intermediate | long |
| 5 | intermediate | short | long |
| 6 | long | short | intermediate |

When the embodiment of the method is carried out, the originally longest voltage pulse 20a, 20b, 20c with the longest pulse width—here, the third original voltage pulse 20c—is shifted to the left up to the point in time 25 at the beginning of the cycle of the pulse width modulation (left edge-aligned). The originally intermediate voltage pulse 20a, 20b, 20c with the intermediate pulse width—here, the second original voltage pulse 20b—remains unshifted (center-aligned). The originally shortest voltage pulse 20a, 20b, 20c with the shortest pulse width—here, the first voltage pulse 20a—is shifted to the right up to the point in time 27 at the end of the cycle of the pulse width modulation (right edge-aligned).

Variants for the shift of the original voltage pulses 20a, 20b, 20c are presented as a function of a respective pulse width in the following Table 4:

TABLE 4

| Edge-aligned (right) | Center-aligned (middle) | Edge-aligned (left) |
| --- | --- | --- |
| long | intermediate | short |
| intermediate | short | long |
| short | long | intermediate |
| long | short | intermediate |
| intermediate | long | short |
| short | intermediate | long |

In the presented embodiment of the method, new measurement windows 32, 40, 44 are provided for two of the three phases. Through shift of two of the three original voltage pulses 20a, 20b, 20c, from which the two shifted voltage pulses 28a, 28c result here, a sensor has available to it larger measurement windows 32, 40, 42 for measurement of values of the currents—here, the new measurement window 32 for the current $I_1$ of the first phase as well as two new measurement windows 40, 44 for the current $I_3$ of the third phase. Usually, two scans and thus measurements of the current per cycle of pulse width modulation are adequate in order to measure the current securely. A value of the current $I_2$ of a second phase (not measured here) is calculated from the values of the current $I_1$, $I_3$ of the two other phases by way of the equation $I_1+I_2+I_3=0$, which states that the sum of all three currents is zero at a point in time.

A voltage as first electric variable remains the same at each phase. In addition, the pulse width is neither lengthened nor altered for any of the voltage pulses 20a, 20b, 20c, 28a, 28b of the voltage in order to make possible measurement of the current as second electric variable. The method is easy to implement and requires no additional load for the electronics of the electric machine as well as no asymmetry in an actuation. For the measurement of a current as second electric variable in each case, a single measuring resistor is employed for the measurement in the case of a sinus commutation and/or field-oriented regulation, without any power limitations.

Figure 4:
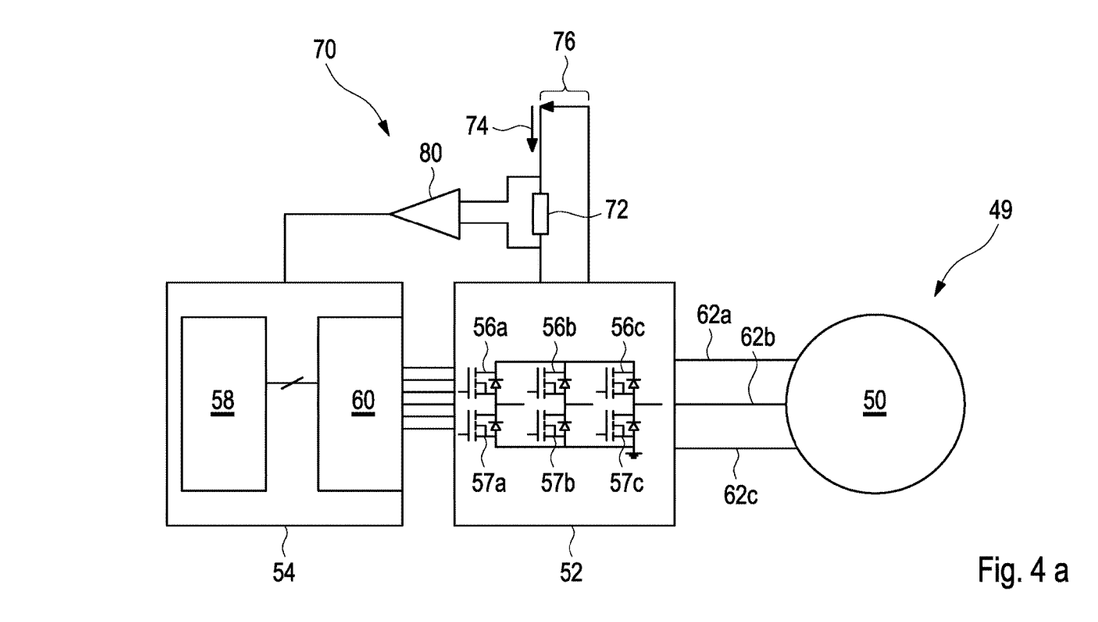
FIG. 4a shows, in schematic illustration, an embodiment of an electric system with which the embodiment of the method according to the invention is to be carried out as well as diagrams relating to the plot of a voltage as electric variables.
FIG. 4b shows, in schematic illustration, an embodiment of an electric system with which the embodiment of the method according to the invention is to be carried out as well as diagrams relating to the plot of a voltage as electric variables.
FIG. 4c shows, in schematic illustration, an embodiment of an electric system with which the embodiment of the method according to the invention is to be carried out as well as diagrams relating to the plot of a voltage as electric variables.

FIG. 4a shows an example of an electric machine 49, which is designed here as an electric motor and has the electromechanical components 50, the power electronics 52, and a control unit 54. In this case, the power electronics 52 comprise three highside switch elements 56a, 56b, 56b* and three lowside switch elements 57a, 57b, 57c and accordingly a total of six electronic switch elements, which are designed as MOSFETs or metal [oxide]** semiconductor field effect transistors or as IGBTs. The control unit 54 comprises a microcontroller 58 and a driver 60, with it being possible via the control unit 54, even independently of the embodiment of the method presented here, to implement a pulse width modulation, designed as a power pulse wide modulation, for a current and/or a voltage as at least one electric variable of the three phases 62a, 62b, 62c of the electric machine 49.

* sic; 56c?—Translator's note
** The word oxide is omitted from the German text.

To this end, reference is made to the diagrams from the two FIGS. 4b and 4c, each of which comprises an abscissa 64 along which the time is plotted. The diagram of FIG. 4b comprises a curve 66a of a first actuation signal for the first pulse-width-modulated electric variable (here, the voltage)

of the first phase 62*a*, a curve 66*b* of a second actuation signal for the pulse-width-modulated voltage of the second phase 62*b*, and a curve 66*c* of a third actuation signal for the pulse-width-modulated voltage of the third phase 62*c* of the electric machine 49. There results from this the curves 68*a*, 68*b*, 68*c*, shown in the diagram from 4*c*, for the voltages of the phases 62*a*, 62*b*, 62*c*. In this case, a curve 68*a* of the voltage of the first phase 62*a* corresponds to the curve 66*a* of the actuation signal predetermined for the first phase, a curve 68*b* of the voltage of the second phase 62*b* corresponds to the curve 66*b* of the actuation signal predetermined for the second phase, and a curve 68*c* of the voltage of the third phase 62*c* corresponds to the curve 66*c* of the actuation signal predetermined for the third phase.

The embodiment of the system 70 according to the invention presented here or a corresponding arrangement comprises only one sensor 72, designed as a measuring resistor, for measurement of a value of a second electric variable, designed here as the current 74 $I_z$ of at least one phase 62*a*, 62*b*, 62*c* of the electric machine 49—here, in an intermediate circuit 76 of the electric machine 49—as well as an amplifier 80, whereby the current $I_z$ to be measured may also be referred to as an intermediate circuit current.

Furthermore, in this case, at least the microcontroller 58, too, is designed as a component of the system 70. The driver 60 and accordingly the control unit 54 are also designed as a component of the system 70 in this case, with the driver 60 being controlled by the microcontroller 58 in the embodiment.

The microcontroller 58, which is already designed, in an operation of the electric machine 40 independent of the method, for supplying the actuation signals, illustrated on the basis of the curves 66*a*, 66*b*, 66*c*, for implementation of the pulse width modulation, is additionally designed for shifting in time the curves 66*a*, 66*b*, 66*c* and thus the pulse of the actuation signals when the embodiment of the method is carried out, with the shape of the curves 66*a*, 66*b*, 66*c* and accordingly of the pulses being retained. The actuation signals are transmitted from the microcontroller 58 to the driver 60, which is designed here as a power amplifier, and, from there, the actuation signals are used for actuation of the MOSFETs 56*a*, 56*b*, 56*c*, 57*a*, 57*b*, 57*c* of the power electronics 52. The pulses for two of the three actuation signals and accordingly two of three pulses at least of an electric variable of the phases 62*a*, 62*b*, 62*c* of the electric machine 50, that is, the original voltage pulses 20*a*, 20*b*, 20*c* of the voltage, are shifted asynchronously by the microcontroller 58. In each case, such an asynchronous shift is carried out for actuation signals with the longest pulse width and the shortest pulse width, as a result of which, as already explained on the basis of the diagrams of FIG. 3 by way of example, the original voltage pulse 20*a* with the shortest pulse width as well as the original voltage pulse 20*c* with the longest pulse width are shifted, resulting in the voltage pulses 28*a*, 28*b* that are shifted for carrying out the measurement.

The invention claimed is:

1. A method for checking an operation of an electric machine having a plurality of electromechanical components, comprising:
    carrying out a pulse width modulation for a plurality of pulses of a first electric variable having three phases; and
    measuring at least one value of a second electric variable within at least one measurement window during a cycle of the pulse width modulation,
    wherein, depending on a positioning of the electromechanical components with respect to one another, the first electric variable has a pulse with a longest pulse width for a first phase of the three phases, a pulse with an intermediate pulse width for a second phase of the three phases, and a pulse with a shortest pulse width for a third phase of the three phases,
    wherein the cycle of the pulse width modulation is delimited by a first point and a second point in time, wherein the first point in time is at a beginning of the cycle and the second point in time is at an end of the cycle,
    wherein at least one of the pulses of the three phases is shifted from a first position to a second position with respect to the first point in time such that a beginning of the at least one of the pulses is the first point in time and at least another one of the pulses of the three phases is shifted from a first position to a second position with respect to the second point in time such that an end of the at least another one of the pulses is the second point in time, and
    wherein the pulse with the longest pulse width is shifted with respect to the first of the two points in time that delimit the cycle, and the pulse with the shortest pulse width is shifted with respect to the second of the two points in time that delimit the cycle.

2. The method according to claim 1, wherein the at least one value of the second electric variable is measured for an intermediate circuit of the electric machine.

3. The method according to claim 1, wherein a point in time that delimits the at least one measurement window is placed on one of the two points in time that delimit the cycle.

4. The method according to claim 1, which is carried out for an electric machine designed as an electric motor.

5. The method according to claim 1, wherein, as the second electric variable, a current flowing through the electric machine is checked, wherein, for a voltage as the first electric variable, two pulses designed as voltage pulses of the three phases respectively are shifted and the current is measured within at least one of these voltage pulses within the at least one measurement window.

6. The method according to claim 1, wherein an operation of the electric machine is checked taking into consideration the at least one measured value.

7. A system for checking an operation of an electric machine having a plurality of electromechanical components, comprising:
    a microcontroller; and
    at least one sensor,
    wherein the microcontroller is configured to carry out a pulse width modulation for a plurality of pulses of a first electric variable having three phases,
    wherein, depending on a positioning of the electromechanical components with respect to one another, the first electric variable has a pulse with a longest pulse width for a first phase of the three phases, a pulse with an intermediate pulse width for a second phase of the three phases, and a pulse with a shortest pulse width for a third phase of the three phases,
    wherein a cycle of the pulse width modulation is delimited by a first point and a second point in time, wherein the first point in time is at a beginning of the cycle and the second point in time is at an end of the cycle,
    wherein the microcontroller is configured to shift at least one of the pulses of the three phases from a first position to a second position with respect to the first point in time such that a beginning of the at least one of the pulses is the first point in time, and shift at least another one of the pulses of the three phases from a first position to a second position with respect to the second point in time such that an end of the at least another one of the pulses is the second point in time, wherein the pulse with the longest pulse width is shifted with respect to the first of the two points in time that delimit the cycle, and the pulse with the shortest pulse width is shifted with respect to the second of the two points in time that delimit the cycle, and wherein the at least one sensor is configured to measure at least one value of a second electric variable within at least one measurement window during the cycle of the pulse width modulation.

8. The system according to claim 7, further comprising: a sensor for measurement of the at least one value of the second electric variable.

9. The system according to claim 7, wherein the at least one sensor is designed as a measuring resistor.

10. The system according to claim 7, wherein the microcontroller is designed such that the pulses are to be shifted asynchronously.

11. The method according to claim 1, wherein, in an initial state, the pulse with the intermediate pulse width wholly overlaps the pulse with the longest pulse width, and the pulse with the shortest pulse width wholly overlaps the pulse with the intermediate pulse width.

12. The method according to claim 11, wherein, in a shifted state, the pulse with the intermediate pulse width overlaps with the pulse with the longest pulse width, the pulse with the intermediate pulse width overlaps with the pulse with the shortest pulse width, and the pulse with the longest pulse width is offset from the pulse with the shortest pulse width.

13. The system according to claim 7, wherein, in an initial state, the pulse with the intermediate pulse width wholly overlaps the pulse with the longest pulse width, and the pulse with the shortest pulse width wholly overlaps the pulse with the intermediate pulse width.

14. The system according to claim 13, wherein, in a shifted state, the pulse with the intermediate pulse width overlaps with the pulse with the longest pulse width, the pulse with the intermediate pulse width overlaps with the pulse with the shortest pulse width, and the pulse with the longest pulse width is offset from the pulse with the shortest pulse width.

* * * * *